US009210277B2

(12) United States Patent
Tan et al.

(10) Patent No.: US 9,210,277 B2
(45) Date of Patent: Dec. 8, 2015

(54) PROCESS TO RELOAD MOBILE PREPAID AIRTIME USING A SELF-SERVICE TERMINAL ACROSS MULTIPLE TELCOS AND MULTIPLE CURRENCIES

(75) Inventors: Seng Chuan Tan, Singapore (SG); Tze Voon Chong, Petaling Jaya (MY); Chung Wah Lee, Petaling Jaya (MY)

(73) Assignee: NUMONI PTE. LTD., Singapore (SG)

( * ) Notice: Subject to any disclaimer, the term of this patent is extended or adjusted under 35 U.S.C. 154(b) by 0 days.

(21) Appl. No.: 14/117,250

(22) PCT Filed: May 9, 2012

(86) PCT No.: PCT/MY2012/000101
§ 371 (c)(1),
(2), (4) Date: Dec. 2, 2013

(87) PCT Pub. No.: WO2012/154031
PCT Pub. Date: Nov. 15, 2012

(65) Prior Publication Data
US 2014/0106706 A1   Apr. 17, 2014

(30) Foreign Application Priority Data

May 10, 2011 (MY) .............................. PI2011002066

(51) Int. Cl.
*H04M 11/00* (2006.01)
*H04M 17/00* (2006.01)
(Continued)

(52) U.S. Cl.
CPC ............... *H04M 17/10* (2013.01); *G06Q 20/18* (2013.01); *G06Q 20/28* (2013.01); *G06Q 20/349* (2013.01); *G07F 19/204* (2013.01); *H04M 17/02* (2013.01);
(Continued)

(58) Field of Classification Search
CPC ......... H04W 8/26; H04W 8/265; H04W 4/24; H04W 4/26; H04W 88/02

USPC ........... 455/405, 406, 407, 411, 412.2, 414.1, 455/408
See application file for complete search history.

(56) References Cited

U.S. PATENT DOCUMENTS

2003/0045269 A1* 3/2003 Himmel .................. H04L 12/14
455/408
2004/0152442 A1* 8/2004 Taisto et al. ................... 455/406
(Continued)

FOREIGN PATENT DOCUMENTS

WO          0111857          2/2001

*Primary Examiner* — Jean Gelin
(74) *Attorney, Agent, or Firm* — Preston Smirman; Smirman IP Law, PLLC

(57) ABSTRACT

A system and method for purchasing and reloading airtime for a local and foreign prepaid mobile phone account are disclosed. The system comprises a plurality of payment receiving means which are connected to a wireless protocol cloud (120), for receiving an airtime purchase and reload request, and also a corresponding payment based on a selected airtime denomination. The payment receiving means are connected to a plurality of servers (140-142). One of the servers is the main server (142) which links the wireless protocol cloud (120) to a group of reloading entities (180). Alternatively, the main server (142) may also be connected to an Internet cloud (150). Therefore, the group of reloading entities may receive the airtime purchase and reload request from the payment receiving means (100) via the Internet cloud (150) or directly from the main server (142) via a plurality of fixed wireless terminals (FWT) (170). The group of reloading entities (180) transfer airtime to prepaid mobile phones based on the value of airtime purchased.

24 Claims, 5 Drawing Sheets

(51) Int. Cl.
*G06Q 20/18* (2012.01)
*G06Q 20/34* (2012.01)
*G07F 19/00* (2006.01)
*G06Q 20/28* (2012.01)
*H04M 17/02* (2006.01)
*H04W 8/26* (2009.01)
*H04W 4/24* (2009.01)
*H04W 4/26* (2009.01)

(52) U.S. Cl.
CPC ............ *H04M 17/20* (2013.01); *H04M 17/203* (2013.01); *H04W 4/24* (2013.01); *H04W 4/26* (2013.01); *H04W 8/26* (2013.01); *H04W 8/265* (2013.01)

(56) References Cited

U.S. PATENT DOCUMENTS

| | | | |
|---|---|---|---|
| 2005/0075929 A1* | 4/2005 | Wolinsky | G06Q 30/0264 705/14.61 |
| 2005/0170818 A1* | 8/2005 | Netanel | G06Q 20/32 455/415 |
| 2006/0108414 A1 | 5/2006 | Sorenson et al. | |
| 2007/0295803 A1 | 12/2007 | Levine et al. | |
| 2011/0159843 A1* | 6/2011 | Heath et al. | 455/411 |
| 2011/0225086 A1* | 9/2011 | Ibasco et al. | 705/40 |
| 2012/0209762 A1* | 8/2012 | Metaireau et al. | 705/39 |
| 2014/0108249 A1* | 4/2014 | Kulpati et al. | 705/44 |

\* cited by examiner

PROCESS TO RELOAD MOBILE PREPAID AIRTIME USING A SELF-SERVICE TERMINAL ACROSS MULTIPLE TELCOS AND MULTIPLE CURRENCIES

CROSS-REFERENCE TO RELATED APPLICATION

The instant application is a national phase of PCT International Patent Application Serial No. PCT/MY2012/000101, filed May 9, 2012, and claims priority to Malaysian Patent Application Ser. No. PI 2011002066, filed May 10, 2011, pending, the entire specifications of both of which are expressly incorporated herein by reference.

FIELD OF INVENTION

The present invention relates to purchasing and reloading mobile prepaid airtime. More particularly, the invention relates to a system and a method to reload prepaid mobile phone accounts across a plurality of mobile network operators and currencies using airtime purchased through a payment receiving means.

BACKGROUND OF THE INVENTION

With the increasing number of migrants in different countries around the world, the need for communication between the migrants and their friends and family back in their home country is rising. Statistically, almost 200 million people around the world are working and living in a country other than theirs. Such migrants may also include the internal or domestic migration of workers from poorer villages or provinces to richer cities or districts for work, for example, the domestic migration of workers in China, India or Cambodia. While communication may be achieved via webcams and voice communication through the Internet, many countries and many people still do not have the luxury of using the Internet for communication. Therefore, the best option of communicating internationally is by phone. Communicating internationally through mobile phone is becoming more affordable with numerous telephone plans and packages offered by service providers all over the world. Additionally, calling across the border using a mobile phone through International Direct Dialing (IDD) is more reliable and provides a better quality of communication in comparison to using calling cards, VoIP protocols and Internet voice communication.

However, in countries with lower socioeconomic level, the cost of international calling can be quite overwhelming. Therefore, friends and family are unable to keep in touch with the migrants due to the cost of international calling. This situation can be quite frustrating and can cause emotional distress to the family members or friends of the migrant who would like to communicate with the migrant. A current solution to the aforementioned situation is to have the migrant transfer airtime from his/her prepaid mobile phone to the prepaid mobile phone of his/her friends or family back in his/her home country. This is known as international airtime transfer. International airtime transfer however, can only be achieved using prepaid mobile plans. The potential of airtime transfer increases with the fact that almost two thirds of the 3.4 billion mobile phone users worldwide subscribe to a prepaid mobile phone plan. Potentially 50 billion top-ups are performed in a year.

With the vast demand, numerous service providers expand their business models to provide airtime transfer not only for the migrants, but for any prepaid mobile phone users intending to transfer local or international airtime from one phone to another. While local airtime transfer may be more commonplace, international airtime transfer is still gaining popularity. In some countries, international airtime transfer may also be used in exchange for cash or other services and products. Consequently, by default through market practice, international air time transfer has become a means by which the lesser privileged transfer value or money rapidly to their loved ones. Nevertheless, international airtime transfer is disadvantageous in that it may require the users to register with the airtime transfer entities and provide information such as credit history, personal details and identification. This may be cumbersome, particularly for migrants who lack ongoing relationships with local banks or who have a bad credit history. For migrants who have tight schedules, having to go through a thorough check for credit history, filling of forms and verification just to transfer international airtime to family or friends back home is time consuming and is unnecessary as they may only stay in a particular country for a short period of time.

One prior art which discloses an apparatus and method for facilitating money or value transfer is US patent publication 2007/0295803. A transaction platform is used to transfer money from a market region to another, specifying transferring airtime value from a mobile phone to another mobile phone. The airtime value can be used for purchasing goods and services or exchanged for cash.

US patent publication 2006/0108414 on the other hand discloses an electronic commerce kiosk used for purchasing telephone calling card minutes and conducting other forms of electronic commerce. While the prior art discloses a kiosk usable by customers to purchase minutes on prepaid calling cards for international calls, it does not explore the usage of reloading a local prepaid mobile phone. Moreover, the prior art provides the customer with a unique identifier and a telephone number for the customer to call and activate the purchase which could be troublesome. The prior art focuses on purchasing airtime for long-distance call using a prepaid calling card. International airtime is therefore not transferred and reloaded to another prepaid mobile phone which may be located outside the country.

Therefore there is a need for a system to purchase airtime and reload a prepaid mobile phone without having to go through a cumbersome registration process and can be done through the means of a payment receiving means.

SUMMARY OF INVENTION

Accordingly, it is a primary object of the present invention to provide a system and a method to reload prepaid mobile phone accounts across a plurality of mobile network operators and currencies using airtime purchased through a payment receiving means.

It is another object of the present invention to purchase and reload airtime for local and foreign prepaid mobile phone accounts.

It is another object of the present invention to purchase and reload airtime for a prepaid mobile phone account without having to go through a registration process.

It is yet another object of the present invention to transfer airtime into a local or non-local foreign prepaid mobile phone account through at least one mobile network operator or at least one airtime transfer provider.

It is further another object of the present invention to provide a system and a method to purchase and reload airtime for a mobile phone account whereby a system operator disburses a sum of funds into the mobile network operator or the airtime transfer provider which will be used for transferring the airtime to the prepaid mobile phones.

It is yet another object of the present invention to provide a payment receiving means that accepts a local currency upon converting the foreign currency using a currency converter module.

To fulfill the aforementioned objectives, an efficient system and method for purchasing and reloading airtime for a prepaid mobile phone account are provided. The system comprises a plurality of payment receiving means which are connected to a wireless protocol cloud, for receiving airtime purchase and reload request, and also a corresponding payment based on a selected airtime denomination. It should be obvious to a person skilled in the art that the GPRS cloud may be substituted with other wireless protocols and standards. The payment receiving means is connected to a plurality of servers. One of the servers is a main server which links the wireless protocol cloud to a group of reloading entities. Alternatively, the main server may also be connected to an Internet cloud. Therefore, the group of reloading entities may receive the airtime purchase and reload request from the payment receiving means via the Internet cloud or directly from the main server via a plurality of fixed wireless terminal (FWT). The group of reloading entities transfer airtime to a prepaid mobile phone account based on the value of airtime purchased.

An efficient system and method for purchasing and reloading airtime for a prepaid telecommunication user account is provided. The system comprises a plurality of kiosks providing a user interface for a user to purchase and make payment for an airtime denomination through a reloading entity. An application server is in communication with both the kiosks and the reloading entity, wherein the application server is managed by a system operator such that a fund of predetermined amount is disbursed into the reloading entity by the system operator. The kiosks send a request of reloading the airtime denomination and sends information of the telecommunication user account to the application server upon receipt of payment from the user. The application server then relays the request and information to the reloading entity such that the reloading entity subtracts the airtime denomination from the fund of predetermined amount followed by reloading the telecommunication user account with a corresponding airtime denomination.

The payment receiving means is an interactive self-service kiosk which accepts payment in cash, cards or vouchers from the user. The kiosk does not require for the users to authenticate their identity. The service provider accepts prima facie that if such identification or authentication of user is required by regulatory bodies, it shall be done offline to the current kiosk, whether by the mobile network operator or an agent whether third party or belonging to the service provider. The kiosk works in a similar manner to a telephone booth and is representative of a point-of-sale (POS) system wherein once payment is deposited, a service or a product is provided.

The system may be used for local or foreign prepaid mobile phones. A system operator manages the system and firstly disburses a sum of funds into the group of reloading entities. Once airtime is transferred to the prepaid mobile phone, the sum of funds is deducted accordingly. The system may be provided with a currency converter module, for maintaining the currency exchange rate. While the user selects the airtime denomination in a currency similar to that of a country of the foreign prepaid mobile phone to be reloaded, the user deposits the payment in a local currency upon conversion, into the payment receiving means.

The present preferred embodiments of the invention consists of novel features and a combination of parts hereinafter fully described and illustrated in the accompanying drawings and particularly pointed out in the appended claims; it being understood that various changes in the details may be effected by those skilled in the arts but without departing from the scope of the invention or sacrificing any of the advantages of the present invention.

BRIEF DESCRIPTION OF THE DRAWINGS

These and other features, aspects and advantages of the present invention will be more fully understood when considered with respect to the following detailed descriptions, appended claims and accompanying drawings wherein:

DETAILED DESCRIPTION OF THE INVENTION

Hereinafter, the present invention shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

The present invention is aimed at providing an efficient system and method for purchasing and reloading airtime for a prepaid mobile phone account. The airtime may be used for making calls or carrying out a value transfer. Value transfer may include exchanging the airtime value for goods or services, or withdrawing it as cash. The airtime value is further a value for a mobile wallet account. The value is used as a payment for a wide range of services and goods through the mobile wallet account. The airtime purchased may be used for a local or a foreign mobile phone account. Preferably, the airtime is purchased by a user of the system to be used by a third party, which may be located at another region, as a token or a gift. For the convenience of description, a user purchasing airtime for a third party shall be referred to as "sender" while the third party shall be referred to as "recipient". Airtime will be added into the prepaid mobile phone account upon purchase, thus, replenishing the remaining or exhausted airtime. The term replenishing the airtime may be used interchangeably with more common prepaid mobile phone terms such as "reloading" or "refilling" or "topping up". While purchasing airtime for a local prepaid mobile phone account may be commonplace, the present invention additionally caters to both purchasing airtime for local and foreign prepaid mobile phones. For convenience of description, airtime purchased for a foreign mobile phone account may be referred to as "international airtime".

In yet another embodiment of the present invention, the purchasing of airtime is not merely used for replenishing remaining or exhausting airtime but also for extending the validity of the prepaid service on the mobile phone account. To avoid the remaining airtime from being forfeited upon expiration of prepaid service on the mobile phone account, the user may purchase the airtime to be reloaded on the local or foreign mobile phone account to extend the validity period of its prepaid service.

Figure 1:
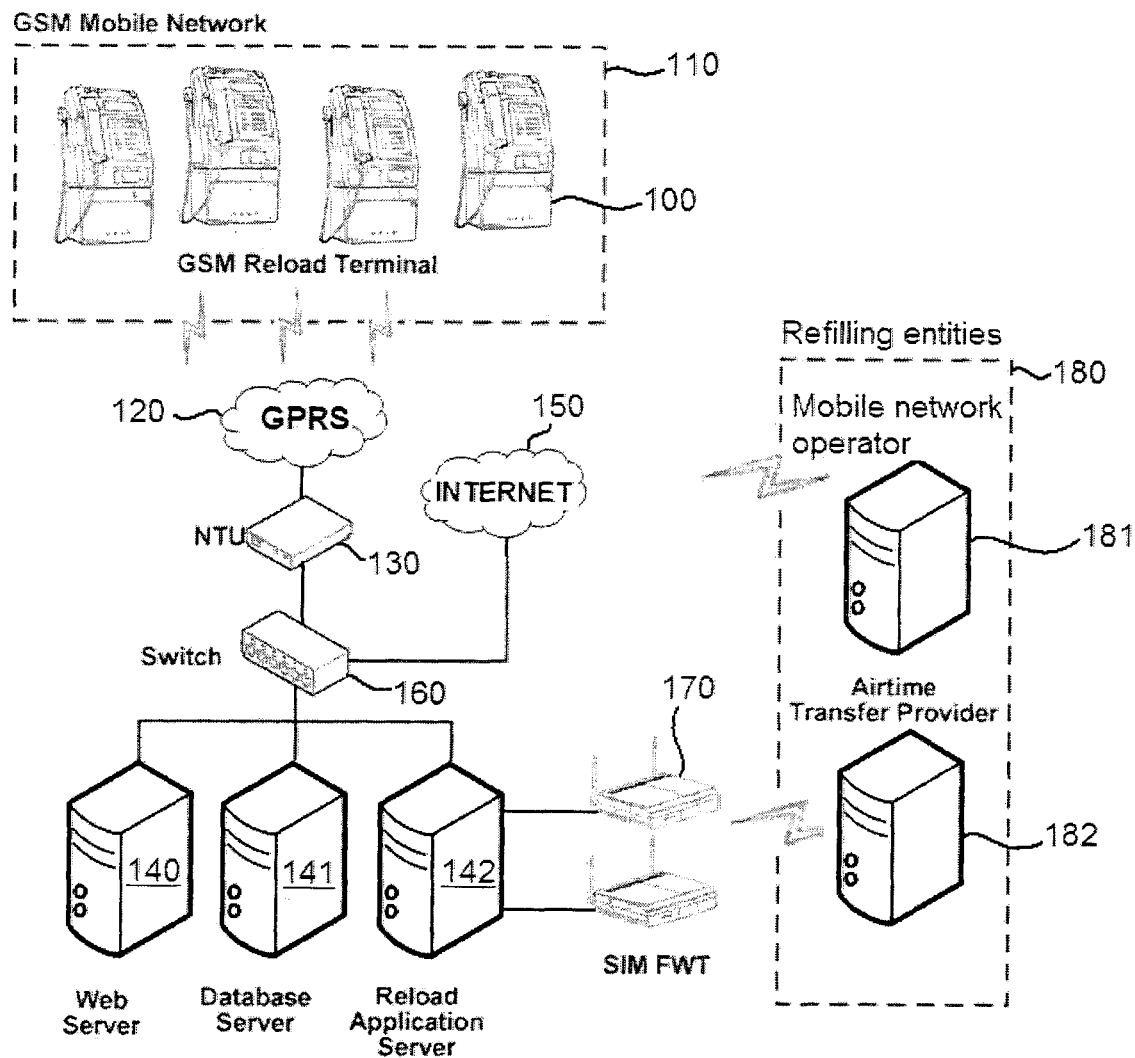
FIG. 1 shows a diagram of a system for purchasing and reloading airtime for prepaid mobile phones.

Referring to FIG. 1, there is shown a diagram of a system for purchasing and reloading airtime for prepaid mobile phone accounts. The system comprises a plurality of payment receiving means (100) for receiving payment from users of the system. The users of the system deposit the payment based on the airtime denomination selected through a user interface of a program installed in each of the payment receiving means (100). The payment receiving means (100) may be connected to each other within a local wireless network (110). In a preferred embodiment, the local wireless network (110) is a Global System for Mobile Communications (GSM) network. The local wireless network (110) is wirelessly connected to a wireless protocol cloud (120). In a preferred embodiment, the wireless protocol cloud is a GPRS cloud. It should be obvious to a person skilled in the art that the GPRS cloud (120) may be substituted with other wireless protocols and standards such as Enhanced Data Rates for GSM Evolution (EDGE), 3G, High Speed Packet Access (HSPA), 3GPP Long Term Evolution (LTE) and the like, in accordance to the wireless technology advancement with time. The GPRS cloud (120) may also be substituted with a wired connection such as a Wide Area Network (WAN). A link between the payment receiving means (100) and a plurality of servers (140-142) is established through the usage of a network termination unit (NTU) (130) which connects the wireless protocol cloud (120) to the servers (140-142). The payment receiving means (100) are also connected to a network cloud (150) via a network switch (160) which is connectable to the NTU (130). The network cloud (150) may be the Internet.

The plurality of servers (140-142) may comprise a web server (140), a database server (141) and a main server (142). The main server (142) manages the users' requests as they are being received from the payment receiving means (100). The main server (142) is connected to a plurality of fixed wireless terminal (FWT) (170) which functions to establish a secured wireless connection between the main server (142) and one or a group of reloading entities (180). In a preferred embodiment, the wireless connection is a GSM link. Alternatively, the reloading entity (180) may also receive the users' requests via the network cloud (150).

Still referring to FIG. 1, the payment receiving means (100) may be a cash acceptance terminal or an electronic commerce kiosk. In a preferred embodiment, the cash acceptance terminal is in a form of an interactive self-service terminal. A plurality of payment receiving means are strategically placed in areas of high population and of easy access to the users. The users of the present invention primarily comprise migrants intending to send international airtime to their friends and family in their home country and users intending to reload their mobile phone account. The cash acceptance terminal is provided with a notes and coins acceptor unit for receiving notes and coins as means of payment. Notes and coins deposited by the users are stored in a hopper which is securely locked inside the payment receiving means (100). In order to collect the notes and coins, the payment receiving means (100) would need to be unlocked by a unique unlocking mechanism. The hopper would then be removed and notes and coins are transferred to a secured storage before being transported or emptied. The cash acceptance terminal is also provided with a plurality of buttons to allow the user to operate the program installed in the kiosk through a graphical user interface (GUI). The user may select a preferred option by hitting the corresponding buttons based on the options display on a screen. Alternatively, the buttons are not required if a touch screen is provided. The operation of the cash acceptance terminal is similar to that of an Automatic Teller Machine (ATM) and a payphone.

In another preferred embodiment, the payment receiving means (100) may accept other modes of payment besides notes and coins. Therefore, the payment receiving means (100) is further provided with a chip card reader and sensor for detecting cards with security chip which include reward cards, point cards, value cards, credit cards or debit cards and also paper vouchers and tickets. The mode of payment is not limited to the aforementioned examples and may be varied and improved in accordance to the progression of payment technology in the future.

In yet another preferred embodiment, the payment receiving means (100) accepts payment by deducting a credit balance in a user payment account. Besides payment by cash, cards or vouchers the user is given the option to register for a payment account with the system. The details of the payment account such as the user's particulars and the balance on the account are stored in the database server (141). The user may deposit funds into his/her payment account via online transaction or over-the-counter payment.

In a preferred embodiment, the airtime purchase and reload system is managed by a system operator who ensures that the system is running at full capacity and maintains the integrity of the system. The system operator coordinates the transaction between the users and the reloading entity (180) such that the process of purchasing airtime for a prepaid mobile phone account is convenient and expedited. A registration process for using the system is not required of the users, thus eliminating unnecessary and potentially cumbersome paperwork. Furthermore, authentication of the users is not required and is merely an optional feature. The airtime purchase and reload system is representative of a point-of-sale (POS) system whereby the users receive a product or a service in exchange for the payment deposited. In the case of the airtime purchase and reload system, the recipient of the goods or service may be the users themselves or a third party as selected by the users.

The airtime purchase and reload system employs an airtime value transfer process whereby the system operator firstly disburses a sum of predetermined fund into the reloading entity (180). The amount of disbursed fund is recorded in the reloading entity (180). Upon receiving an airtime purchase request from the users, the reloading entity (180) transfers a corresponding amount of airtime into the particular prepaid mobile phone account, deducting from the sum of funds disbursed by the system operator. International airtime purchase involves a currency exchange rate at the point of sale. The currency exchange rate is determined by the system operator and may change accordingly under the purview of the system operator. Therefore, the value of airtime purchase for a foreign prepaid mobile phone account in the foreign currency is converted to a local currency based on the currency exchange rate which is maintained by currency converter module installed within the main server (142). The users deposit the payments into the payment receiving means (100) in a local currency upon conversion.

In another aspect of the present invention, the currency exchange rate may be determined by an external entity. Therefore, the currency converter module is not installed within the main server (142) because the currency exchange is executed by the external entity on behalf of the system operator.

The payments deposited by the users into the payment receiving means (100) are collected by the system operator. The collection may be used on a rolling basis to cover the sum of funds disbursed to the reloading entity (180).

In another aspect of the present invention, the payment receiving means (100) is provided to convenience stores, malls, mobile phone shops, business owners or the like. The payment receiving means (100) is sold to the aforementioned entities by the system operator such that airtime purchase and reload services provided by the system may be utilised by the customers of these entities. The entities collect the payment from their payment receiving means (100) while retaining a commission rate. The payment collected is deposited into a system operator's account. Upon deposition into the system operator's account, the system operator will allow usage of the payment receiving means (100) for a certain amount of airtime, period of usage or reload frequency. In order for the payment receiving means (100) to be fully operable, the entities continually deposit the payment to the system operator. Once the amount of airtime, period of usage or reload frequency is reached, the operation of the payment receiving means (100) is halted or switched to being offline. Upon receiving the payment deposition, the system operator switches the operation of the payment receiving means (100) to being online.

Still referring to FIG. 1, the reloading entity (180) is a mobile network operator (181) or an airtime transfer provider (182). The mobile network operator (181) may be telecommunication companies (Telcos) catering to users from different countries. Local service providers cater to local users' prepaid mobile phone account while foreign service providers cater to users' prepaid mobile phone account of the relevant countries. The prepaid mobile phone account which is to be reloaded must belong to at least one of the mobile network operator (181) in order for the transaction to be executed. The mobile network operator (181) and the airtime transfer provider (182) receives the users' requests wirelessly either through the network cloud (150) or the FWT (170). Airtime purchase and reload may be completed by either the mobile network operator (181) or the airtime transfer provider (182).

The airtime purchase and reload system may be used for reloading a local prepaid mobile phone account or a foreign prepaid mobile phone account.

The process for reloading a local prepaid mobile phone account is described hereinafter:

Once the payment is deposited into the payment receiving means (100) by the user, the main server (142) receives the airtime purchase and reload request (also known as a "top-up" or a "refill" request), in the form of an information packet containing the name of the local mobile network operator (181), the number of the prepaid mobile phone account and the airtime purchase denomination. The main server (142) forwards the information packet to the corresponding mobile network operator (181). Depending on the system operator's payment account, airtime reload request may be executed using different protocols. If the account is of the soft personal identification number (PIN) type, the reload is achieved via an Unstructured Supplementary Service Data (USSD) protocol. If the account is of the PIN pool type, the reload is achieved via the Internet using an Application Program Interface (API). The API used is of the XML or SOAP type. The local service provider directly adds the purchased airtime into the local prepaid mobile phone account based on the denomination selected by the users. Upon the completion of a transaction (successful or unsuccessful), the mobile network operator (181) sends the status of the transaction in the form of a response code to the main server (142) which acknowledges the status and updates the transaction in the database server (141). The main server (142) further sends the status of the transaction to the user via a short message (SMS), email or any other appropriate means.

The airtime purchase and reload for a foreign prepaid mobile phone account is executed in a similar fashion to airtime purchase and reload for a local prepaid mobile phone account. However, the airtime purchase and reload for a foreign prepaid mobile phone account may be carried out by either the foreign mobile network operator (181) or the airtime transfer provider (182).

Figure 2:
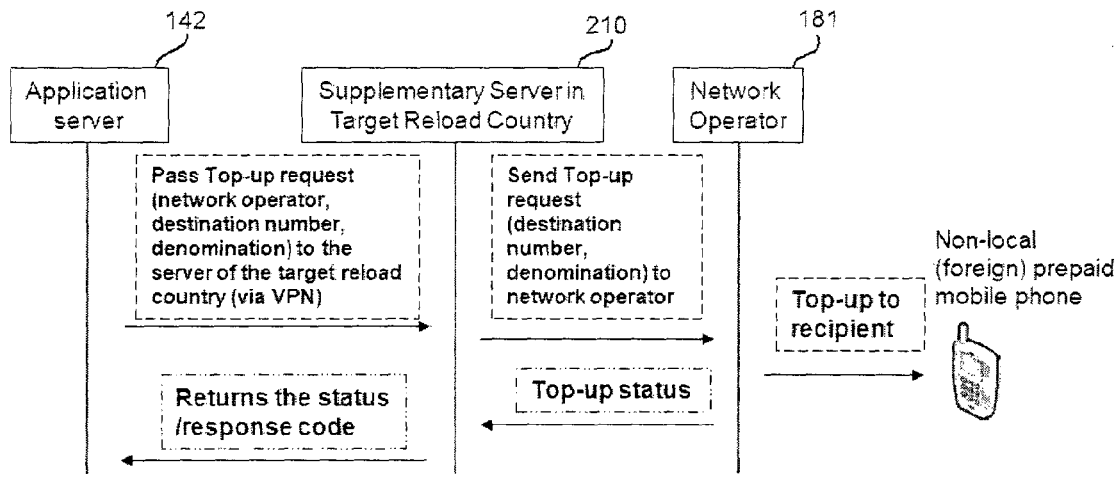
FIG. 2 is a flow diagram for a first embodiment of the airtime purchase and reload method for a foreign prepaid mobile phone account carried out by the foreign mobile network operators.

Referring now to FIG. 2, there is shown a flow diagram for a first embodiment of the airtime purchase and reload method for a foreign prepaid mobile phone account carried out by the foreign mobile network operator (181). As shown in FIG. 2, once the payment is deposited into the payment receiving means (100) by the user, the main server (142) receives the airtime purchase and reload request, in the form of an information packet containing the name of the foreign mobile network operator (181), the number of the prepaid mobile phone account and the airtime purchase denomination. The main server (142) forwards the information packet to the corresponding foreign mobile network operator (181) via a network. In a preferred embodiment, the network is a Virtual Private Network (VPN). The VPN could work over Internet or point-to-point connections. The foreign mobile network operator (181) directly adds the purchased airtime into the foreign prepaid mobile phone account based on the denomination selected by the users. Upon the completion of a transaction (successful or unsuccessful), the foreign mobile network operator (181) sends the status of the transaction via the network, in the form of a response code to the main server (142) which acknowledges the status and updates the transaction in the database server (141). The main server (142) further sends the status of the transaction to the user via SMS, email or any other appropriate means.

The above mentioned first embodiment of the airtime purchase and reload method for foreign prepaid mobile phone account is applicable when the top-up mechanism allowed by the foreign mobile network operator (181) is via Application Programming Interface (API). However, if the foreign mobile network operator (181) only allows USSD protocol or Short Messaging Service (SMS) reload, a supplementary server (210) is required. The supplementary server (210) is preferably located at the foreign country of the prepaid mobile phone account to be reloaded. The supplementary server (210) acts as an intermediary between the main server (142) and the foreign mobile network operator (181). Therefore, information packets from the main server (142) are firstly sent to the supplementary server (210) to be forwarded to the corresponding foreign mobile network operator (181). The supplementary server (210) also accepts the status of the transaction first before forwarding it to the main server (142) for storage in the database server (141) and for informing the users.

Figure 3:
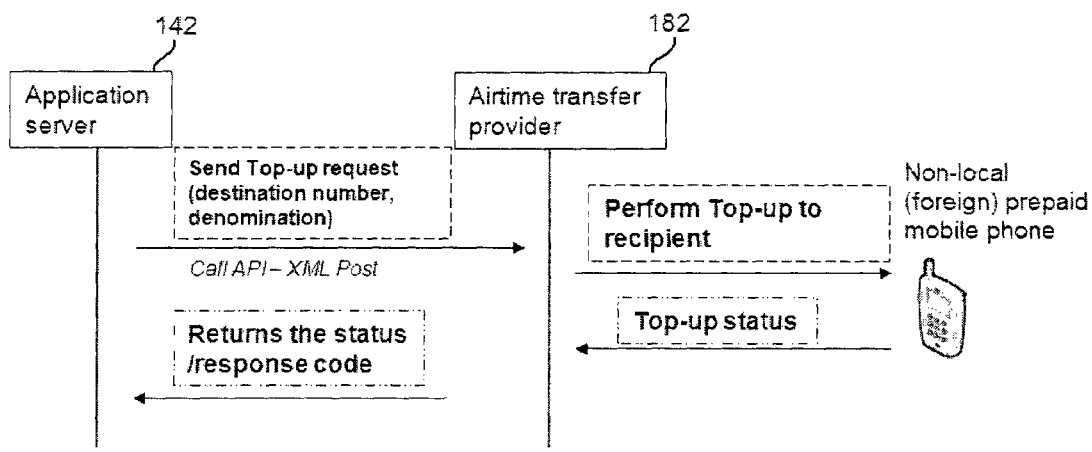
FIG. 3 is a flow diagram for a second embodiment of the airtime purchase and reload method for a foreign prepaid mobile phone account carried out by the airtime transfer provider.

Referring now to FIG. 3, there is shown a flow diagram for a second embodiment of the airtime purchase and reload method for a foreign prepaid mobile phone account carried out by the airtime transfer provider (182). As shown in FIG. 3, once the payment is deposited into the payment receiving means (100) by the user, the main server (142) receives the airtime purchase and reload request, in the form of an information packet containing the number of the prepaid mobile phone account and the airtime purchase denomination. The main server (142) forwards the information packet to the airtime transfer provider (182). In a preferred embodiment, the information packet is forwarded via an API-XML or API-SOAP protocol. The airtime transfer provider (182) directly adds the purchased airtime into the foreign prepaid mobile phone account based on the denomination selected by the users. Upon the completion of a transaction (successful or unsuccessful), the non-local prepaid mobile phone account (182) automatically sends the status of the transaction to the airtime transfer provider (182) which forwards it in the form of a response code to the main server (142). The main server (142) acknowledges the status and updates the transaction in the database server (141). The main server (142) further sends the status of the transaction to the user via SMS, email or any other appropriate means.

Figure 4:
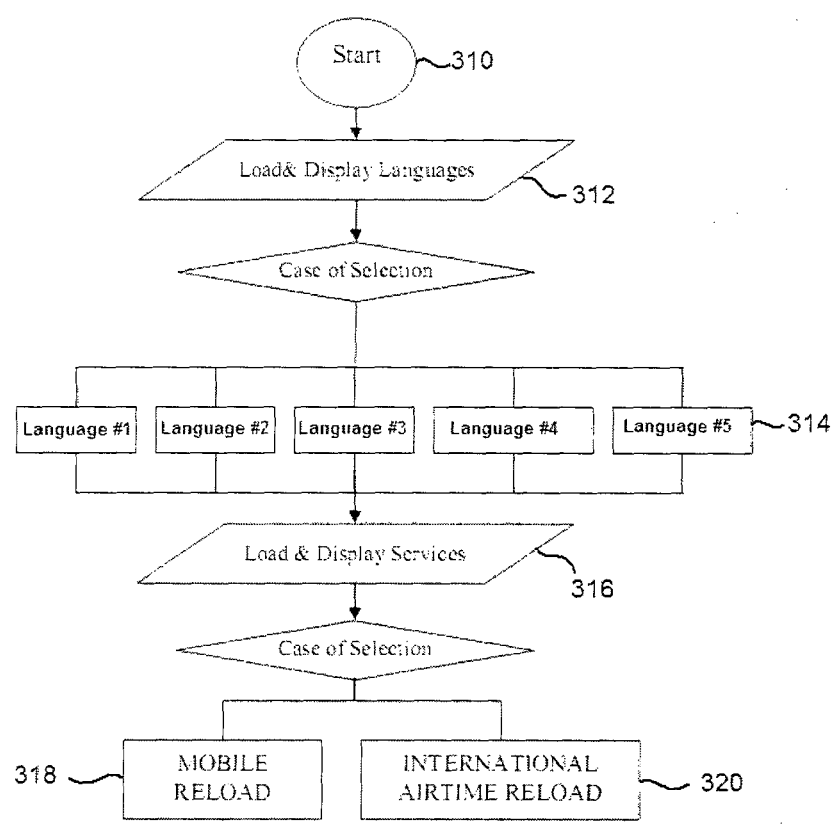
FIG. 4 is a diagram showing preliminary steps of a method for receiving an airtime purchase and reload request.

Referring to FIG. 4, there is shown a flow diagram illustrating the process of using the program installed in the payment receiving means (100) through a user interface. The flow diagram also represents preliminary steps of a method for receiving an airtime purchase and reload request. The process starts at block (310). The program loads and displays the language option as shown by block (312). The user is prompted to select a preferred language. The language as shown by blocks (314) may be English, Malay language, Mandarin, Bangladeshi, Vietnamese, Thai, Tamil, German, Spanish, French, Japanese, Korean or another language depending on the local language at which the payment receiving means (100) is used. Upon selecting the preferred language, the program loads and displays the services provided by the airtime purchase and reload system as shown by block (316). The services as represented by blocks (318) and (320) may be a mobile phone account reload and an international airtime reload. A user intending to reload a local prepaid mobile phone account would select the first option while a user intending to reload a foreign prepaid mobile phone account would select the second option. The users' selection would be received by the main server (142).

Figure 5:
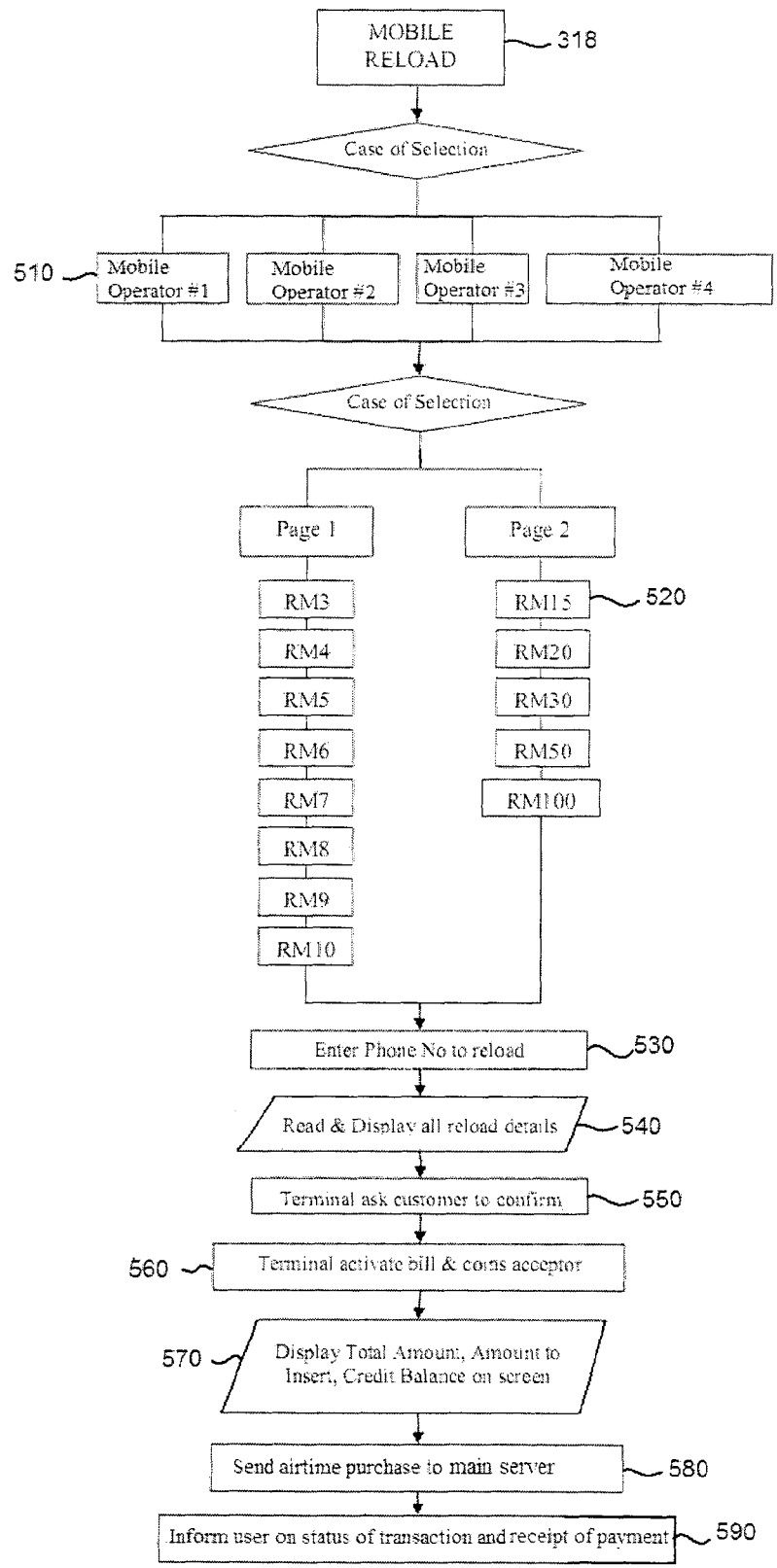
FIG. 5 shows a process flow for receiving a purchase and reload request for a local prepaid mobile phone account.

Referring now to FIG. 5, there is shown a process flow for receiving a purchase and reload request for a local prepaid mobile phone account. From selecting block (318) of FIG. 4, the user is prompted to select the mobile network operator (181) of the prepaid mobile phone account to be reloaded. The display screen provides a list of local mobile network operator (181) as shown by blocks (510). For example, if the system is being used in Malaysia, the local mobile network operator (181) would include Celcom, Hotlink and Digi. Upon selecting the local mobile network operator (181), the user is provided with the option of selecting from a list of airtime purchase denomination as shown by block (520). The airtime purchase denomination may range from smaller values with smaller increments to bigger values with bigger increments. The airtime purchase denomination may be displayed in several pages depending on the number of options provided by the system. Once the user has selected a desired airtime purchase denomination, the program prompts the user to key in the local prepaid mobile phone account number to be reloaded as shown by block (530). The phone number as received by the program is then determined to be correctly keyed in. This is done by the program by truncating the phone number, eliminating integers that represent country codes or international calling codes. If the phone number is incorrectly keyed in, the program would prompt the user to key in the number again. Upon receiving the service provider selection, the airtime purchase denomination selection and the prepaid mobile phone account number, the program interprets and displays the details as shown by block (540). The user confirms the details of the request as shown by block (550) and the payment receiving means (100) activates the notes and coins acceptor unit as shown by block (560). The user is prompted to deposit the payment for the selected denomination. The screen displays the total amount of the purchase, the payment already deposited and the payment balance to be deposited as shown by block (570). Once the payment deposition is completed, the system sends the airtime purchase and reload request to the main server (142) as shown by block (580). A last step as represented by block (590) involves informing the user of the status of the transaction and the receipt of payment.

Figure 6:
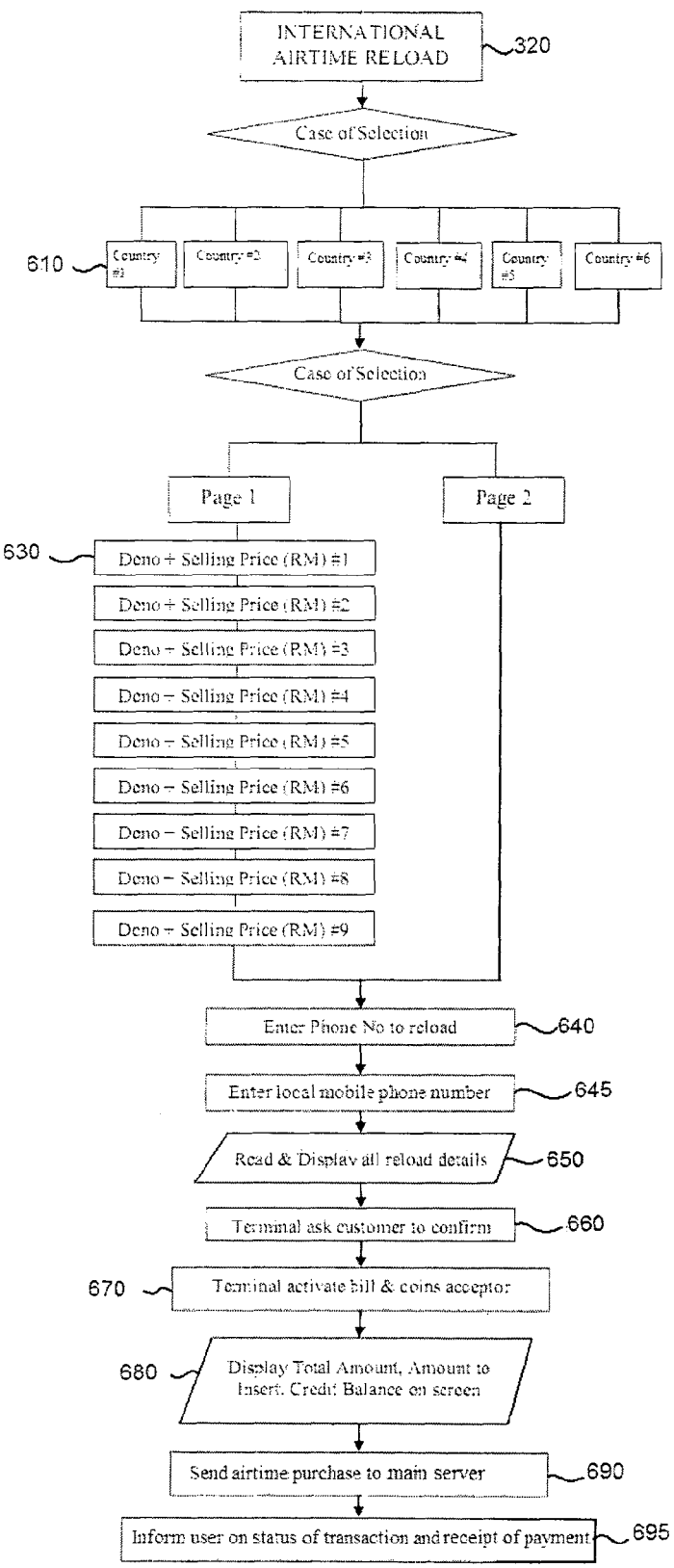
FIG. 6 shows a process flow for receiving an international airtime purchase and reload request for a foreign prepaid mobile phone account.

Referring now to FIG. 6, there is shown a process flow for receiving an international airtime purchase request for a foreign prepaid mobile phone account. From selecting block (320) of FIG. 4, the user is prompted to select the country of the foreign prepaid mobile phone account to be reloaded. The display screen provides a list of country as shown by blocks (610). The countries may include the likes of Thailand, Vietnam, Bangladesh, India and Indonesia depending on the location of the foreign prepaid mobile phone account. Upon selecting the country of choice, the user is provided with the option of selecting from a list of airtime purchase denomination as shown by block (630). The airtime purchase denomination is displayed in the currency of the foreign prepaid mobile phone account's country. For example, if the country of the foreign prepaid mobile phone account is India, and the user is in Malaysia, the airtime purchase denomination is displayed in Rupee but the payment is made in Ringgit. The foreign currency is converted to a local currency using the currency converter module so that payment can be made in the local currency. Once the user has selected a desired airtime purchase denomination, the program prompts the user to key in the foreign prepaid mobile phone account number to be reloaded as shown by block (640). The mobile network operator (181) of the foreign prepaid mobile phone account may be automatically determined by the system based on the phone number keyed in. The mobile network operator (181) may also be selected by the user if it is known to the user. The phone number as received by the program is determined to be correctly keyed in. This is done by the program by truncating the phone number, eliminating integers that represent country codes or international calling codes. If the phone number is incorrectly keyed in, the program would prompt the user to key in the phone number again. As shown by block (645), the program would then prompt the user to key in the user's mobile phone number to receive an acknowledgment short message (SMS) on the status of successful upload to the foreign mobile phone account. Upon receiving the service provider selection, the airtime purchase denomination selection, the prepaid foreign mobile phone account number and the user's mobile phone mobile phone number, the program interprets and displays the details as shown by block (650). The user confirms the details of the request as shown by block (660) and the payment receiving means (100) activates the notes and coins acceptor unit as shown by block (670). The user is prompted to deposit the payment for the selected denomination in the local currency. The screen displays the total amount of the purchase, the payment already deposited and the payment balance to be deposited as shown by block (680). Once the payment deposition is completed, the system sends the airtime purchase and reload request to the main server (142) as shown by block (690). A last step as represented by block (695) involves informing the user of the status of the transaction and the receipt of payment.

Although this disclosure has described and illustrated certain preferred embodiments of the invention, it is to be understood that the invention is not restricted to those particular embodiments. Rather, the invention include all embodiments which are functional or mechanical equivalence of the specific embodiments and features that have been described and illustrated.

The invention claimed is:

1. A system to purchase and reload airtime for a local and foreign prepaid mobile phone account, comprising:
    at least one computer server;
    at least one payment receiving system connected to the computer server through a wireless protocol cloud, the payment receiving system receiving payments from a user of the system to purchase and reload airtime for the prepaid mobile phone accounts designated by the user;
    an airtime purchase and reload request system connected to the payment receiving system, the airtime purchase and reload request system sending the airtime request to the computer server upon receiving payments of the users from the payment receiving system;
    a system operator to administer and manage the computer server; and
    one or more reloading entities linked to the computer server, wherein the system operator deposits a predetermined amount of funds to the reloading entities to pre-purchase a predetermined amount of airtime credit from the reloading entities, wherein the deposit occurs prior to a request by the user to purchase and reload airtime for the prepaid mobile phone account designated by the user;
    wherein when the user requests to purchase and reload airtime for the prepaid mobile phone account designated by the user, the airtime purchase request is sent to the reloading entities, the reloading entities then deduct a corresponding amount of airtime credit from the predetermined funds deposited by the system operator, and transfer the corresponding amount of airtime credit purchased by the user to the prepaid mobile phone account designated by the user.

2. A system to purchase and reload airtime for a designated foreign prepaid mobile phone accounts, comprising:
    at least one computer server;
    at least one payment receiving system connected to the computer server through a wireless protocol cloud, the payment receiving system receiving payments in a home currency from a user of the system to purchase and reload airtime denominated in a foreign currency for a foreign prepaid mobile phone accounts designated by the user;
    an airtime purchase and reload request system connected to the payment receiving system, the airtime purchase and reload request system sending the airtime request to the computer server upon receiving payments of the users from the payment receiving system;
    a currency converter module connected to the computer server for converting the home currency to a designated foreign currency;
    a system operator to administer and manage the computer server; and
    one or more foreign reloading entities linked to the computer server, wherein the system operator deposits a predetermined funds to the foreign reloading entities to pre-purchase a predetermined amount of airtime credit from the foreign reloading entities, wherein the deposit occurs prior to a request by the user to purchase and reload airtime for the prepaid mobile phone account designated by the user;
    wherein when the user requests to purchase and reload airtime denominated in foreign currency for a foreign prepaid mobile phone account designated by the user, the airtime request is sent to the computer server, the currency converter module converts the payments of the user from the home currency to the designated foreign currency and the computer server forwards the request to the foreign reloading entities, the foreign reloading entities then deduct a corresponding amount of airtime credit from the predetermined funds deposited by the system operator, and transfer the corresponding amount of airtime credit purchased by the user to the foreign prepaid mobile phone account designated by the user.

3. The system according to claim 1 or 2, wherein the payment receiving system are connected to each other within a local wireless network.

4. The system according to claim 1 or 2, further comprising:
    a network termination unit for linking the payment receiving system to the computer server by establishing a connection between the wireless protocol cloud and the computer server;
    a network switch for connecting the payment receiving system to an Internet cloud wherein the network switch is connectable to the network termination unit; and
    a plurality of fixed wireless terminals being connected to the computer server for establishing a secured wireless connection with the reloading entities.

5. The system according to claim 1 or 2, wherein the computer server comprises:
    a web server;
    a database server; and
    a main server for managing the users requests as they are being received from the payment receiving system.

6. The system according to claim 1 or 2, wherein the payment receiving system is installed with a program for purchasing and reloading airtime for a prepaid mobile phone.

7. The system according to claim 6, wherein the payment receiving system is provided with a plurality of buttons to allow the user to operate the airtime purchase and reload program.

8. The system according to claim 1 or 2, wherein the payment receiving system does not require authentication of the users of the system.

9. The system according to claim 1 or 2, wherein the payment receiving system is a cash acceptance terminal in the form of an interactive self-service kiosk.

10. The system according to claim 9, wherein the cash acceptance terminal is provided with a notes and coins acceptor unit for receiving notes and coins as system of payment.

11. The system according to claim 9, wherein the cash acceptance terminal is provided with a card reader and sensor for detecting cards with security chips, paper vouchers and tickets as alternative modes of payment.

12. The system according to claim 1 or 2, wherein the system operator coordinates the transaction between the users and the reloading entities.

13. The system according to claim 1, wherein the reloading entities comprise:
    at least one mobile network operator; and
    at least one airtime transfer provider.

14. The system according to claim 13, wherein the mobile network operator comprises local and foreign mobile network operators.

15. A method for airtime purchase and reload for a foreign prepaid mobile phone carried out by a foreign mobile network operator using an airtime purchase and reload system, comprising the steps of:
- depositing a predetermined amount of funds to the foreign mobile network operator to pre-purchase a predetermined amount of airtime credit from the foreign mobile network operator, wherein the deposit occurs prior to a request by a user to purchase and reload airtime for a prepaid mobile phone account designated by the user;
- receiving the airtime purchase and reload request in a form of an information packet from the payment receiving system;
- forwarding the information packet to the foreign mobile network operator via a network;
- directly adding the purchased airtime into the foreign prepaid mobile phone account by the foreign mobile network operator;
- sending the status of the transaction in the form of a response code to a main computer server via the network;
- acknowledging and updating the status of the transaction in a database computer server;
- sending the status of the transaction to the user via short messaging service or email.

16. The method according to claim 15, wherein the foreign mobile network operator allows an application programming interface top-up mechanism.

17. The method according to claim 15, wherein if the foreign mobile network operator allows an unstructured supplementary service data protocol or short messaging service reload, the step of forwarding the information packet to the foreign mobile network operator is replaced with a step of sending the information packet to a supplementary computer server, before forwarding the information packet to the foreign mobile network operator.

18. The method according to claim 15, wherein if the foreign mobile network operator allows an unstructured supplementary service data protocol or short messaging service reload, the step of sending the status of the transaction in the form of a response code to the main computer server is replaced with a step of sending the status of transaction to a supplementary computer server, before forwarding the status to the main computer server.

19. The method according to claim 15, wherein the network is a virtual private network.

20. The method according to claim 15, wherein the information packet contains a name of the mobile network operator, a number of the prepaid mobile phone and an airtime purchase denomination.

21. A method for airtime purchase and reload for a non-local or foreign prepaid mobile phone carried out by an airtime transfer provider using an airtime purchase and reload system, comprising the steps of:
- providing a main computer server and a database computer server;
- depositing a predetermined amount of funds to a mobile network operator to pre-purchase a predetermined amount of airtime credit from the mobile network operator, wherein the deposit occurs prior to a request by a user to purchase and reload airtime for a prepaid mobile phone account designated by the user;
- receiving an airtime purchase request in a form of an information packet from a payment receiving system;
- forwarding the information packet to an airtime network provider via an API-XML or API-SOAP protocol directly adding the purchased airtime into the prepaid mobile phone account;
- sending the status of the transaction in the form of a response code to the main computer server;
- acknowledging and updating the status of the transaction in the database computer server; and
- sending the status of the transaction to the user via a short messaging service or email.

22. A method for receiving an international airtime purchase and reload requests, comprising the steps of:
- depositing a predetermined amount of funds to a mobile network operator to pre-purchase a predetermined amount of airtime credit from the mobile network operator, wherein the deposit occurs prior to a request by a user to purchase and reload airtime for a prepaid mobile phone account designated by the user;
- providing a computer server system selectively operable to perform the steps of:
- prompting the user to select a language of preference;
- receiving the selection from the user to purchase international airtime;
- prompting the user to select the country of a foreign prepaid mobile phone account to be reloaded;
- providing the user with the option of selecting from a plurality of airtime purchase denominations in the currency of the foreign prepaid mobile phone's country;
- converting the airtime purchase denomination from a foreign currency to a local currency;
- prompting the user to key in a foreign prepaid mobile phone number;
- determining if the mobile phone number is correctly keyed in;
- prompting the user to key in a local mobile phone number for acknowledgement;
- displaying the country, the phone number and the selected airtime purchase denomination details for confirmation by the user;
- prompting the user to deposit a payment for the selected denomination in the local currency; and
- informing the user regarding the status of the transaction and the receipt of payment.

23. The method according to claim 22, wherein the step of converting the airtime purchase denomination is executed by a currency converter module.

24. The method according to claim 22, wherein the step of converting the airtime purchase denomination is under the control of a system operator.

* * * * *